United States Patent [19]

Rugg

[11] Patent Number: 5,659,966
[45] Date of Patent: Aug. 26, 1997

[54] HYDROSTATIC LEVEL MEASURING AND SURVEY APPARATUS

[76] Inventor: Scott H. Rugg, 1221 Oliver Ave., San Diego, Calif. 92109

[21] Appl. No.: 666,047

[22] Filed: Jun. 19, 1996

Related U.S. Application Data

[63] Continuation-in-part of Ser. No. 493,561, Jun. 22, 1995, abandoned.

[51] Int. Cl.$^6$ ............................... G01C 5/04; G01C 9/22
[52] U.S. Cl. ................................................. 33/367
[58] Field of Search ................................ 33/367

[56] References Cited

U.S. PATENT DOCUMENTS

| | | | |
|---|---|---|---|
| 919,934 | 4/1909 | Nugent | 33/367 |
| 946,660 | 1/1910 | Deslattes | 33/367 |
| 1,042,248 | 10/1912 | McGowan | 33/367 |
| 2,587,998 | 3/1952 | Heath | 33/367 |
| 2,664,645 | 1/1954 | Qualman | 33/367 |
| 3,117,381 | 1/1964 | Durkin | 33/367 |
| 3,577,645 | 5/1971 | Zurawski | 33/367 |
| 3,849,898 | 11/1974 | Turloff | 33/367 |
| 4,041,613 | 8/1977 | Bishop | 33/367 |
| 4,169,320 | 10/1979 | Bennett | 33/367 |

FOREIGN PATENT DOCUMENTS

| | | | |
|---|---|---|---|
| 1183702 | 7/1959 | France | 33/367 |
| 1535642 | 8/1968 | France | 33/367 |
| 208712 | 8/1988 | Japan | 33/367 |

*Primary Examiner*—Thomas B. Will
*Attorney, Agent, or Firm*—John R. Duncan; Frank D. Gilliam

[57] ABSTRACT

A hydrostatic system for measuring the elevation at two spaced locations. A first stand having a multi-leg base includes a toroidal tank slidably mounted on a shaft that extends through a tank central aperture. The legs include a bracket arrangement to permit securing each leg at an acute angle, an obtuse angle or parallel to the first stand. Thus, the tank can be positioned above or below the leg connection to measure high or low levels. A second stand includes a vertical transparent tube marked with linear distance indicia. A flexible hose connects the tank to the tube so that water (or other liquid) in the tank, hose and tube reaches the same level in both tank and tube. Two or more second stand, transparent tube and hose assemblies may be connected to the tank to permit simultaneous measurement of elevation at plural locations. The first and second stands and transparent tube may each be telescoping to increase the range of elevation measurements that can be accommodated.

12 Claims, 1 Drawing Sheet

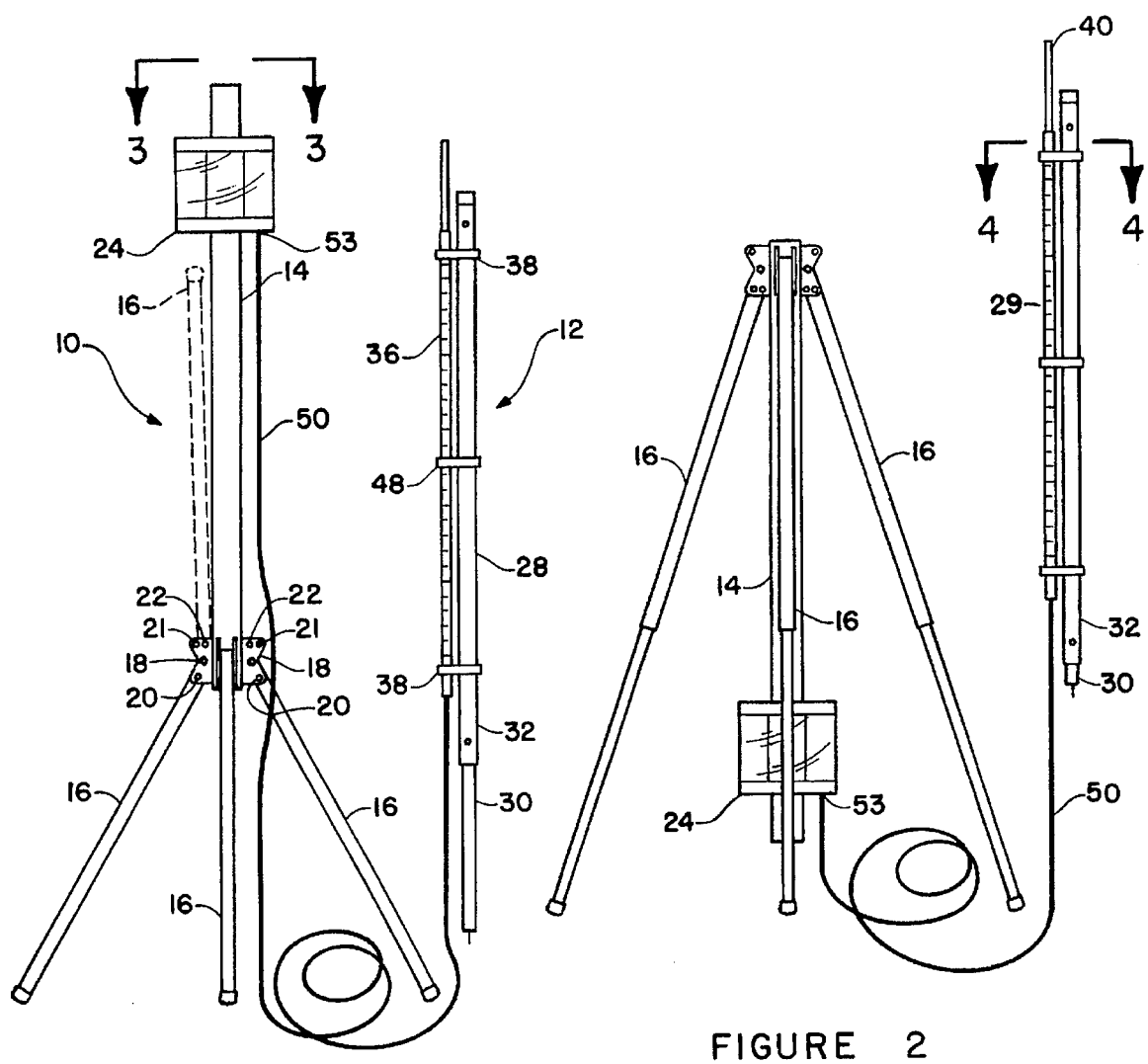
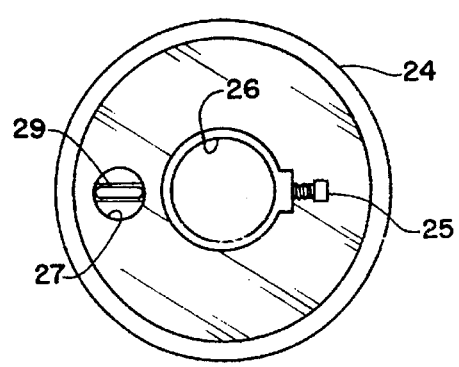
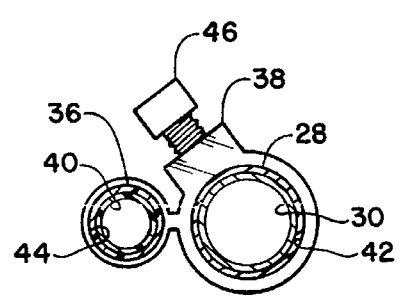

HYDROSTATIC LEVEL MEASURING AND SURVEY APPARATUS

This application is a continuation-in-part of application Ser. No. 08/493,561 filed on Jun. 22, 1995, now abandoned.

BACKGROUND OF THE INVENTION

This invention relates in general to hydrostatic level apparatus and, more specifically, such apparatus adapted for measuring existing vertical elevation and for setting relative differential elevations.

A wide variety of instruments exist for measuring relative levels and setting uniform or differential levels at spaced locations over large areas, in many cases where a clear line of sight does not exist between the different locations.

Typically, levels and differences in elevation are checked and determined using transits sighted to a leveling rod or rotating laser light sources which create a line of light on objects in the plane of rotation. These instruments generally require care and skill in setting up, often require two operators and cannot be used where there is not a continuous line of sight between locations to be leveled, as in the case of different rooms in a building, etc., and often cannot be used in very tight quarters.

To overcome these problems, systems, often called "water leveling systems", have been developed which operate under the principal that a liquid, such as water, in a U-shaped tube will always seek the same level in both legs. Such devices range from very simple applications utilizing a transparent hose filled with water, with two persons holding the ends at the same level, to very complex systems including means for filling and emptying the system, optical means for precise measurements, etc. In general, these systems have problems in requiring two persons to set up and operate them, lack of easy portability, a tendency to spill the liquid during use, and a lack of versatility, e.g., the ability to measure great differences in elevation, the ability to measure elevation of both floors and ceilings, etc. Many such systems include a supplementary tank to supply liquid to the system. These tanks cause errors in measurement unless carefully calibrated during use. Also, prior systems generally are difficult to use for leveling low-lying structures, such as the underside of mobile homes and the like.

Among the prior art water levels are those described by Izumitani in U.S. Pat. No. 5,267,782, Fields in U.S. Pat. No. 4,691,445 and Hoffmeyer in U.S. Pat. No. 5,309,645. While each of these is useful for a specialized purpose, using complex mounting and level reading means, they are not versatile and useful for varied leveling purposes.

Thus, despite the large number of known water leveling systems, there is a continuing need for such systems having improved portability, the ability to measure levels from near the floor to ceiling height or higher, improved ease of use by one person and having increased versatility.

SUMMARY OF THE INVENTION

The above-noted problems are overcome, and advantages achieved, by a water leveling system that basically comprises a generally toroidal tank with a relatively large cross sectional or surface area, mounted on a first stand having a vertical first shaft slidably extending through the tank toroid aperture, a transparent tube with a relatively small cross sectional area compared to the tank, mounted on a second shaft and a flexible hose connecting said tank and tube so that a liquid, such as water, in the tank, tube and hose can reach the same level in the tank and tube.

The first stand comprises the first shaft having, when assembled, three spaced legs secured to the lower end of the first shaft to support the first shaft in a vertical orientation. The legs are foldable from a stowed position lying along the first shaft and a second position deployed at generally uniform angles to the first shaft. Provision may be made for adjusting the relative positions of the three legs to accommodate an irregular support surface. While three legs are preferred for simplicity and stability, four or more legs may be used if desired. The first shaft may have two or more telescoping sections to allow greater length where desired.

The legs may be positioned at any of three positions, outwardly at an obtuse angle with the shaft and tank well above the connection of the legs to the shaft, or with the legs extending outwardly but at an acute angle to the shaft with the shaft and tank near the ground between the legs and in a storage position latched generally parallel and adjacent to the shaft.

The tank has a configuration formed by a closed plane shape rotated about an axis in lying in the plane of the shape but slightly spaced from that axis, where the side of the shape adjacent to the axis is a straight line parallel to the axis. Preferably, the shape is a rectangle. The central aperture of the toroid is a sliding fit over the first shaft. The tank is positionable along the first shaft using friction, setscrews or any other means to hold it at a selected position.

The second shaft includes means for supporting it on a surface, such as the ground or a floor. Since the person operating the system will generally be at the second shaft location to read height indicia on the transparent tube, in many cases a simple blunt lower end will be sufficient. Alternately, a spike end to be pushed into the surface may be used, or a tripod type base of the sort used with the first shaft may be use. The second shaft may be used to measure the height of overhead surfaces, such as ceilings by pressing the upper end of the second shaft against such a surface. The second shaft may be made up of two or more telescoping sections that can adjust either through the top or bottom of the larger diameter tube sections to provide greatly variable length, typically for measuring ground surfaces and high ceilings.

The transparent tube will carry suitable indicia indicative of measurements being made. Generally, there will a standard distance from one or both ends of the second shaft to a base line on the tube. Preferably, sliding clips with setscrews are used to position the transparent tube parallel to the shaft. The clips include two parallel, closely adjacent holes for receiving the transparent tube and shaft, with the clip preferably held to the transparent tube by friction (or, by a setscrew, if desired) and held to the shaft by a setscrew. Desirably, a third clip may be positioned between top and bottom clips at the upper and lower ends of the transparent tube. The third clip can be slid along the transparent tube and secured at a selected location, such as to mark a particular water level.

If desired, the transparent tube may be made up of two or more telescoping transparent tubes with sliding seals between them so that a longer overall tube with greater range can be formed. If desired, two or more second shaft and transparent tube assemblies can be connected to one tank to permit simultaneous level measurement at two or more locations.

BRIEF DESCRIPTION OF THE DRAWING

Details of the invention, and of preferred embodiments thereof, will be further understood upon reference to the drawing, wherein:

FIG. 1 is a schematic elevation view of the apparatus of this invention with the tank at a high elevation;

FIG. 2 is a schematic elevation view of the apparatus of claim 1 with the tank at a low elevation;

FIG. 3 is a detail plan view of the tank; and

FIG. 4 is a detail plan view of a transparent tube support clip.

DETAILED DESCRIPTION OF PREFERRED EMBODIMENTS

Referring to FIG. 1, there is seen a schematic representation of the hydrostatic measuring apparatus of this invention, including a first stand 10 and a second stand 12.

First stand 10 includes a first shaft 14, typically a rigid plastic or metal tube or rod mounted on a tripod of legs 16. Legs 16 are hinged to first shaft 14 about hinge pins on channel brackets 18 that partially enclose the upper leg ends. Legs 16 may be secured in a first position at an obtuse angle to shaft 14 as shown in FIG. 1 in which they support shaft 14 in a vertical alignment above legs 16, with spring loaded pins on each leg in a lower hole 20 in bracket 18. In a second positions, legs 16 the pins are secured in holes 21 as seen in FIG. 2, with the legs at an acute angle to shaft 14. In a third position, legs 16 can lie against shaft 14 with the leg pins in holes 22, as indicated in broken lines in FIG. 1 for one leg 16. This forms a compact package for easy portability by merely grasping a leg at approximately a balance point and carrying the assembly horizontal. While this arrangement of conventional leg spring pins and the particular bracket arrangement shown is preferred, any other suitable hinges lockable in the two deployed and stored positions may be used.

A generally toroidal tank or reservoir 24 has a central aperture sized to fit snugly over first shaft 14 and be slidable therealong. While friction is often sufficient to hold tank 24 in any selected position along shaft 14, preferably a setscrew 25 such as seen in FIG. 3 is used at the top and/or bottom of the tank. Tank 24 may be formed from any suitable material, including plastics such as acrylics, metals such as aluminum, etc. For ease and economy of manufacture and transparency to allow the interior liquid level to be observed an acrylic plastic is preferred. Tank 24 includes a fill opening 27 closed by a plug 29 during movement. The upper surface of tank 24 is preferably recessed so that the tank can be filled by opening plug 29 and pouring water into the recess, that will then drain through opening 27 into the tank.

If desired, first shaft 14 may be made up of two or more telescoping tube sections to give a greater range of heights at which tank 24 may be positioned. Typically, the outermost telescoping tube would fit within aperture 26 (FIG. 3) and the innermost tube would be fastened within the outer tube. Any suitable means, such as setscrews of tightening sleeves of the sort often used on extendable photographic tripod legs may be used to lock the telescoping tubes together at a selected degree of extension, as desired.

Second stand 12 includes a second shaft 28, which may be formed from a rigid plastic or metal tube or rod. In a preferred embodiment, second shaft 28 is a tube telescoping over a lower tube or rod 30 with a tightenable sleeve 32 or other means (e.g. setscrews) for holding the upper tube 29 at the desired location along lower tube 30. Lower tube 30 can be extended and secured both through the top (not shown) and the bottom (as seen in FIG. 1) of tube 29 so readings can be made easily on ground surfaces and high ceilings, etc. Thus, upper and lower tubes 29 and 30 may be telescoped together to provide a compact and easily portable package and extended to the desired height for level measurement.

Where second stand is to be hand-held during measurement and recording of indicated height in a notebook or the like, the lower end of lower tube 30 may have a blunt end with a cap or the like to reduce slipping. Or, a short spike may be provided to further reduce slipping and, in some cases, support second stand 12 in the upright position on a dirt or wood surface. If desired, a tripod-like support of the sort used with first stand 10 may be used here.

A transparent tube 36 is mounted on second stand 12. Preferably, tube 36 is mounted on two offset clips 38, typically sections of a plastic extrusion, generally parallel to second shaft 28. As seen in FIG. 2, one or more transparent secondary tubes 40 may be telescoped within tube 36 to extend the range of heights that can be measured. Suitable indicia indicating linear measurements are provided along each of tubes 36 and 40. While any suitable transparent material, such as glass or plastics, may be used for transparent tubes 36 and 40, an acrylic is preferred for ease of manufacture and high transparency.

As seen in FIG. 4, clips 38 receive the assembly of shaft 12 tubes 28 and 30 in one cylindrical opening 42 and the assembly of tubes 36 and 40 in the other, parallel, cylindrical opening 44. A setscrew 46 secures each of the two clips 38 to shaft 12 near the top and bottom of tube 28, with clips 38 held to tube 36 by friction, an adhesive or the like.

One or more additional clips 48, configured the same as clips 38, can be positioned along tubes 28 and 36. Typically, clips 48 can be positioned to indicate a desired level, two can show a range of levels, etc. They can be easily secured at any position by setscrews 46.

A flexible hose 50 is connected, at connector 53, between tank 24 and the lower end of transparent tube 36 so that liquid can move back and forth to bring the levels in tank 24 and tube 36 or 40 to the same level. Connector 53 can be at the lower side of tank 24 or in the tank bottom as shown. Any flexible plastic or rubber hose material may be used. As mentioned above, additional connectors 53 and hoses 50 can connect to additional second stands identical with second stand 12 for greater versatility.

As seen in FIG. 3, tank 24 is in the general form of a toroid. While the walls of aperture 26 should be cylindrical to conform to the preferred cylindrical outside wall of first shaft 14, the outer wall could have any desired configuration, although the surface area of liquid in the tank should remain constant as the level rises or falls. While a circular cross section for first shaft 14 and aperture 26 is preferred for ease of manufacture and smooth tank movement along the shaft, other mating cross-sections such as square, hexagonal, etc. could be used if desired.

Tank 24 is a sealed vessel with an outlet opening for connection to hose 50 and a combination fill opening and vent 27 (as seen in FIG. 3) to allow air to enter or escape as the water level changes. Plugs on flexible straps may be preferably provided in order to seal vent 27 and the hose connection 53 when the tank is moved. A similar plug may be provided to seal the open end of transparent tube 36 or 40. Other devices such as quick connect couplings with shut off capability can be fitted at the outlet, the end of tube 36 and appropriate mating couplings may be provided on both ends of flexible hose 50 to facilitate the ease and speed of set-up and break-down of the assembly.

While tank 24 may be formed in any suitable manner, including gluing-up piece parts, the tank, vent and outlet can all be simultaneously formed by methods such as slush casting or blow molding.

Tank 24 has a very much greater surface area than that of transparent tube 36, so that errors in measuring are significantly reduced. This arrangement reduces the amount of error in measuring due to the reduced amount of draw-down or up-take in tank 24 as a result of the respective up-take or draw-down of water in transparent tube 36 during a survey of an area with a particular elevation change. For example, with a tank 24 to transparent tube 36 surface area ration of 500:1, an up-take of 1 inch of water in transparent tube 36 will result in a draw-down of 0.002 inch in tank 24. This amount of draw-down is so small that it is well below the practical accuracy limits of the system. Other typical systems with small ratios such as 3:1 will have a draw-down of 0.34 inch on a tank side with an up-take of 1 inch on a transparent tube side, thus requiring calibration and/or correction calculations to obtain accurate readings.

Since tank 24 has sufficient volume and surface area, if desired, two or more second stands 12 and hoses 50 may be connected to the outlet so that levels at several different locations can be measured and compared simultaneously.

For especially compact storage and easy portability, first shaft 14 may be a hollow tube having an open end and a diameter sufficient to allow second stand 12 to be inserted thereinto.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. Hydrostatic apparatus for measuring relative elevation levels which comprises:

a first stand having a vertically arrangeable first shaft;

said first stand having at least three legs hingedly connected to said first stand adjacent to a first end of said first stand;

latch means for selectively securing each of said legs at any of three positions a first position lying at an acute angle to said first shaft, a second position lying at an obtuse angle to said first shaft and a third position generally parallel and closely spaced from said shaft;

a generally toroidal tank having a central aperture slidably positionable along said first shaft;

a second stand having a vertically arrangeable second shaft;

elongated transparent tube means positionably mounted along said second shaft;

linear measurement indicia along said tube;

flexible hose means connectable between said tank and said tube;

whereby liquid in said tank and tube will seek the same level so that relative elevation between liquid levels in said tank and said tube and between plural locations of said tube are shown by said indicia.

2. The apparatus according to claim 1 wherein said tube means comprises at least two telescoping transparent tubes, sealed to prevent liquid leakage as said tubes are telescoped together and apart, whereby a greater range of level measurements and measurement of overhead elevations are possible.

3. The apparatus according to claim 1 wherein at least one of said first and second shafts is telescoping whereby the vertical elevation of said at least one of said tank and said tube means can be further varied.

4. The apparatus according to claim 1 wherein said transparent tube is mounted on said second shaft by first and second clips each having first and second parallel openings, said first opening sized to slip over said transparent tube in frictional contact therewith and said second opening sized to fit over said second shaft, and each of said second openings including a setscrew for securing said clip to said shaft.

5. The apparatus according to claim 4 further including at least one additional said clip positioned between said first and second clip, slidable to any selected location between said first and second clips.

6. The apparatus according to claim 1 including at least one setscrew on said toroidal tank for releasably engaging said first shaft to hold said toroidal tank in a selected position, said tank being manually slidable up and down said shaft when said setscrew is released.

7. Hydrostatic apparatus for measuring relative elevation levels which comprises:

a first stand having a vertically arrangeable first shaft;

said first stand mounted at a first end on a tripod base formed from three equally spaced legs hingedly connected to said first end;

means for releasably securing each of said legs in one of three positions; a first position lying at an acute angle to said stand, a second position lying at an obtuse angle to said stand and a third position lying generally parallel to said stand;

a generally toroidal tank having a central aperture slidably positionable along said first shaft;

a second stand having a vertically arrangeable second shaft;

elongated transparent tube means positionably mounted along said second shaft;

linear measurement indicia along said transparent tube;

flexible hose means connectable between said tank and said tube;

whereby liquid in said tank and tube will seek the same level so that relative elevation between liquid levels in said tank and said tube and between plural locations of said tube are shown by said indicia.

8. The apparatus according to claim 7 wherein said tube means comprises at least two telescoping transparent tubes, sealed to prevent liquid leakage as said tubes are telescoped together and apart, whereby a greater range of level measurements and measurement of overhead elevations are possible.

9. The apparatus according to claim 7 wherein at least one of said first and second shafts is telescoping whereby the vertical elevation of said at least one of said tank and said tube means can be further varied.

10. The apparatus according to claim 7 wherein said transparent tube is mounted on said second shaft by first and second clips each having first and second parallel openings, said first opening sized to slip over said transparent tube in frictional contact therewith and said second opening sized to fit over said second opening shaft, and each of said second openings including a setscrew for securing said clip to said shaft.

11. The apparatus according to claim 10 further including at least one additional said clip positioned between said first and second clip, slidable to any selected location between said first and second clips.

12. The apparatus according to claim 7 including at least one setscrew on said toroidal tank for releasably engaging said first shaft to hold said toroidal tank in a selected position, said tank being manually slidable up and down said shaft when said setscrew is released.

* * * * *